(12) United States Patent
Roycroft

(10) Patent No.: US 6,712,652 B2
(45) Date of Patent: Mar. 30, 2004

(54) POWER TRAIN

(75) Inventor: Terence James Roycroft, Waiuku (NZ)

(73) Assignee: Gibbs Technologies Limited (GB)

( * ) Notice: Subject to any disclaimer, the term of this patent is extended or adjusted under 35 U.S.C. 154(b) by 0 days.

(21) Appl. No.: 10/055,132

(22) Filed: Jan. 22, 2002

(65) Prior Publication Data

US 2002/0098748 A1 Jul. 25, 2002

(30) Foreign Application Priority Data

Jan. 24, 2001 (GB) ............................................. 0101781

(51) Int. Cl.$^7$ ................................................. B60F 3/00
(52) U.S. Cl. ..................................... 440/12.51; 440/38
(58) Field of Search ........................... 440/12.5, 12.51, 440/12.57, 12.58, 12.59, 12.6, 12.61, 38, 40–43; 446/163–165

(56) References Cited

U.S. PATENT DOCUMENTS

| | | | | |
|---|---|---|---|---|
| 2,400,132 A | * | 5/1946 | Porter .......................... | 114/283 |
| 3,183,878 A | * | 5/1965 | Aschauer ...................... | 440/38 |
| 3,595,199 A | * | 7/1971 | Faxas ........................ | 440/12.69 |
| 3,598,074 A | * | 8/1971 | Schubert ...................... | 114/325 |
| 3,688,731 A | | 9/1972 | Houle | |
| 4,540,376 A | * | 9/1985 | Turbowitz et al. ........... | 446/164 |
| 5,581,932 A | * | 12/1996 | Bell ........................... | 43/26.1 |
| 5,755,602 A | | 5/1998 | Klukowski | |
| 2002/0081917 A1 | * | 6/2002 | Roycroft et al. ............. | 440/38 |

FOREIGN PATENT DOCUMENTS

| | | | |
|---|---|---|---|
| EP | 1 174 300 | * 1/2002 | |
| GB | WO 99/24273 | 5/1999 | |
| JP | 2-124308 | * 5/1990 | ................ 440/12.5 |

* cited by examiner

Primary Examiner—Sherman Basinger
(74) Attorney, Agent, or Firm—Young & Basile, P.C.

(57) ABSTRACT

Amphibious vehicle power train 10 comprises a prime mover 12, transfer drive 14, transmission 16, and differential 17. A marine drive power take-off (PTO) comprises chain, belt, or gear drive, and optional decoupler 22. Rotational axis 65 of marine drive shaft 64 and impeller shaft 66 of centrifugal pump 68 are substantially perpendicular to longitudinal vehicle axis 11. The driven road wheels may be the rear wheels. Alternative embodiments comprise PTO drive from differential 17 (FIG. 3); from the crankshaft timing end (80, FIG. 4); or by a sandwich PTO between engine and transmission (56, FIG. 5). FIG. 6 shows PTO's from the gearbox of a motorcycle type power train, driving centrifugal pump 102 and differential 90. At least one further decoupler may be provided in wheel driveshafts 23, 25, to disconnect drive thereto while the amphibian is used in marine mode. The prime mover 12 may be an engine or may be an electric motor.

19 Claims, 4 Drawing Sheets

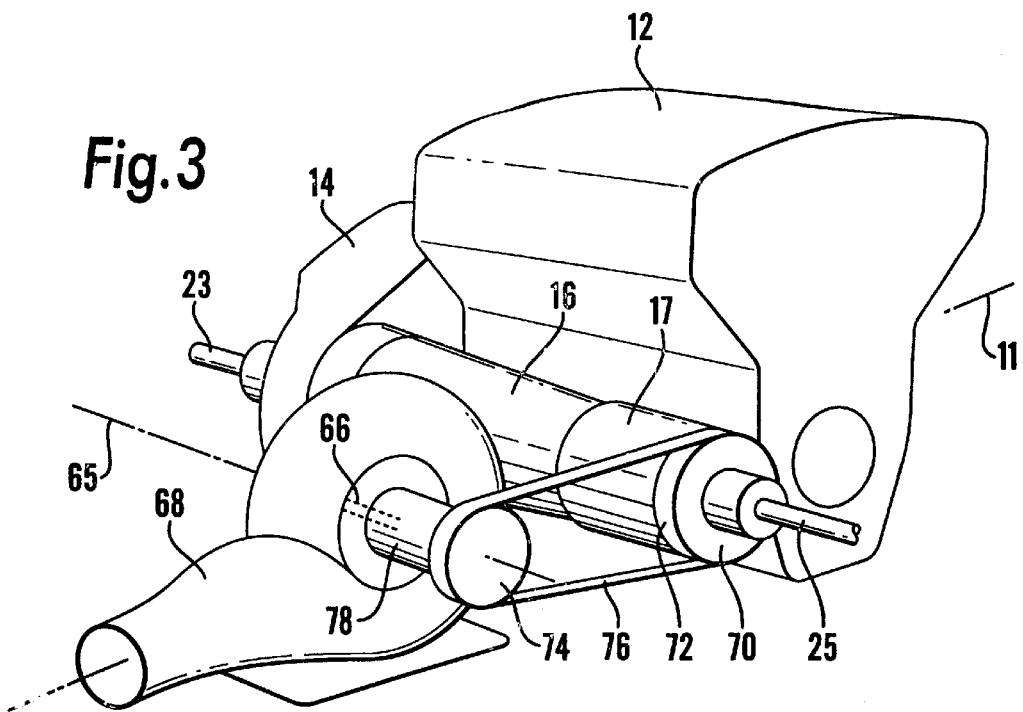
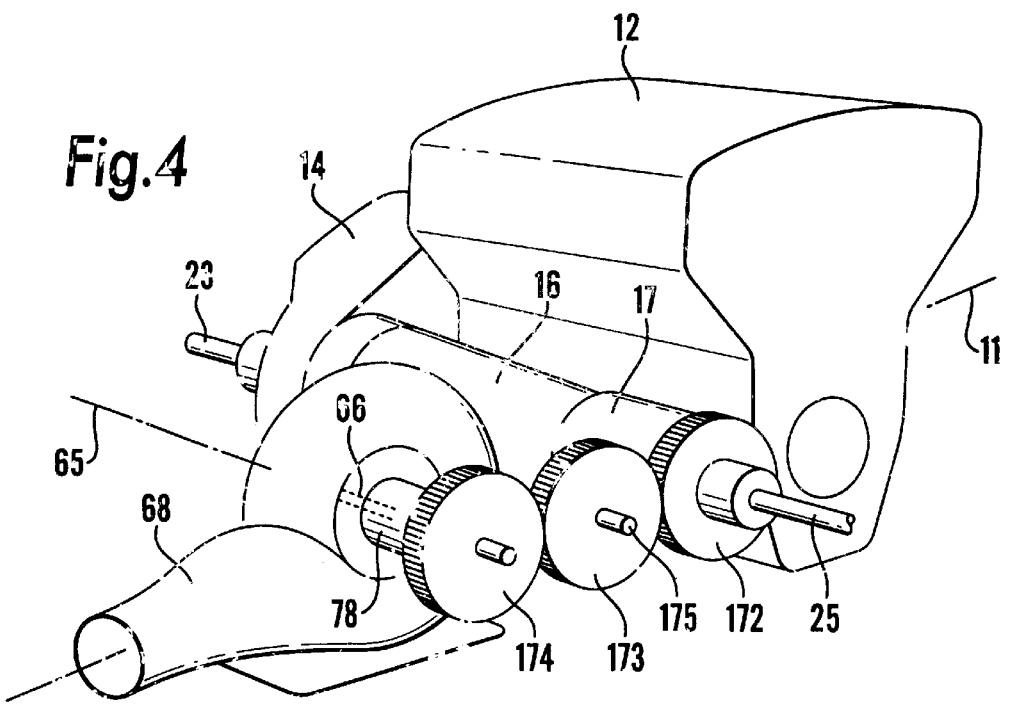

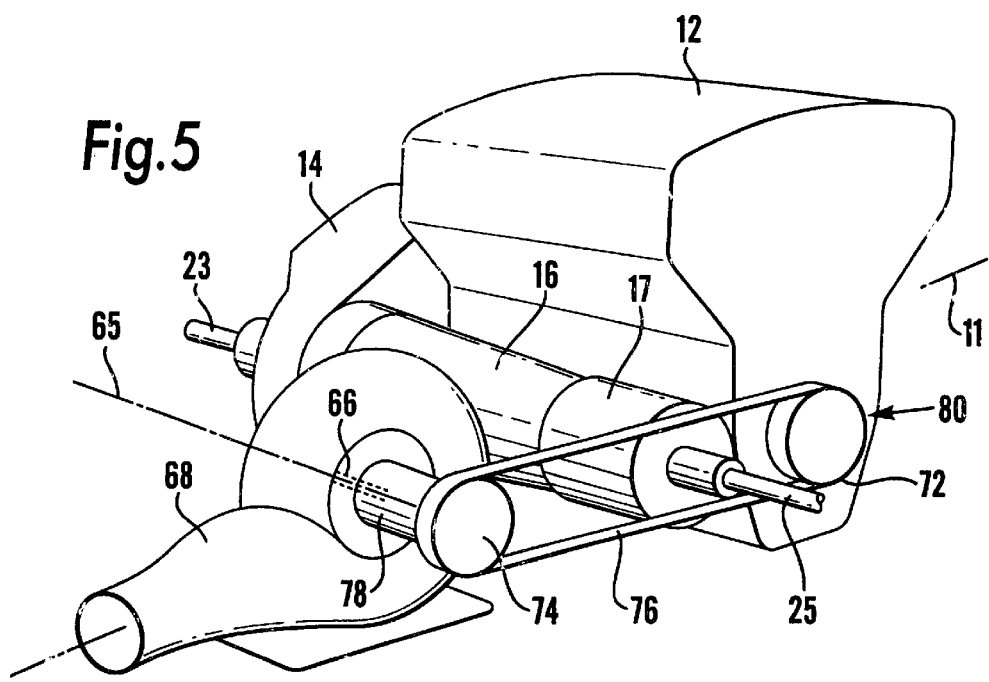
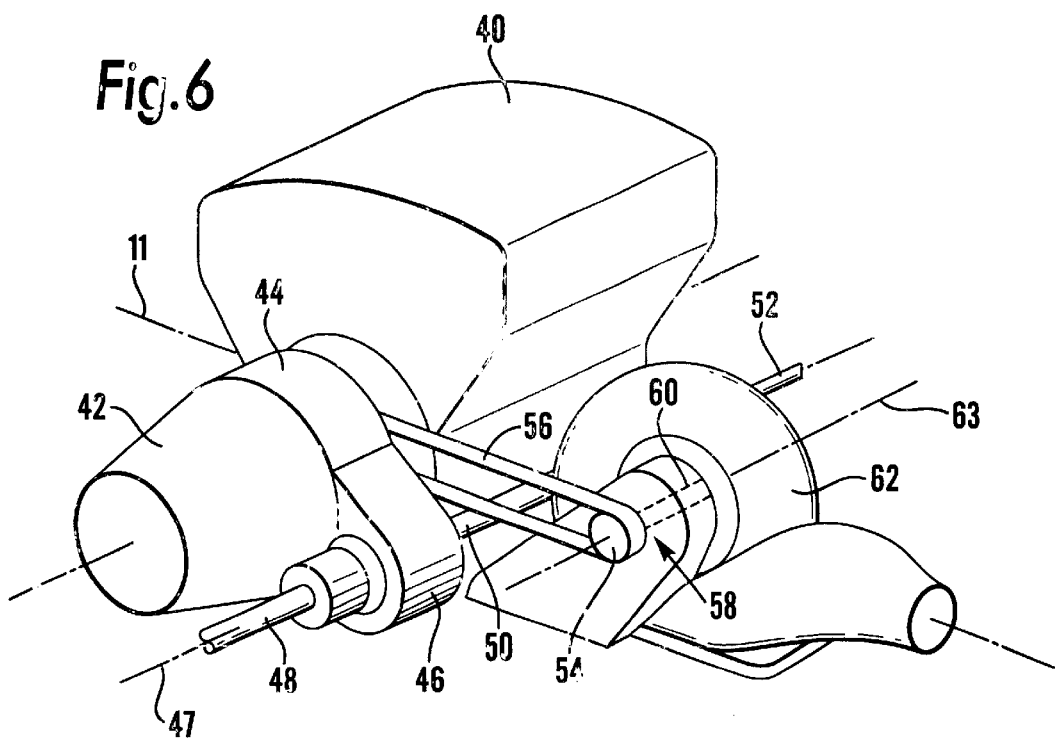

POWER TRAIN

FIELD OF THE INVENTION

The present invention relates to a power train for an amphibious vehicle and in particular, though not exclusively, to a power train for driving the rear wheels and the marine propulsion means of an amphibious vehicle. The present invention also relates to an amphibious vehicle.

DESCRIPTION OF THE RELEVANT ART

In an amphibious vehicle it is advantageous to use a power train in which the prime mover, which will typically be an engine, and transmission are positioned towards the rear of the vehicle for driving the rear wheels of the vehicle. The weight of the power train is therefore positioned towards the back of the vehicle, which is necessary for good vehicle performance when the vehicle is in marine mode and in particular when the vehicle is planing. Furthermore, the rearward position of the power train maximises the space available towards the front of the vehicle for the passenger compartment.

It has been proposed in FIG. 3 of our co-pending European patent application No. EP 1 174 300 to provide a mid-engined vehicle having a transverse power train, with a power take-off for driving a water jet unit. However, as in other known amphibious vehicle arrangements, the drive shaft of the water jet unit is in line with the vehicle axis, and the axis of rotation of the power take-off is perpendicular to the vehicle axis. Consequently, it is necessary to turn the axis of drive from the power take-off through 90° by means of a pair of bevel gears.

This arrangement has the disadvantages of reducing the power output of the power take-off to the water jet unit due to frictional losses in the bevel gears, and of being costly to produce. The bevel gears also occupy space in an area of the vehicle where space is at a premium, and require housing in a specially designed casing.

SUMMARY OF THE INVENTION

It is an object of the invention to provide a power train for an amphibious vehicle in which the above mentioned disadvantages are reduced or substantially obviated. It is a further object of the invention to provide an amphibious vehicle having such a power train.

According to a first aspect of the present invention, there is provided a power train for an amphibious vehicle, the power train comprising a prime mover, a transmission and a power take-off adapted to provide drive to an impeller of a marine propulsion means, in which a rotational axis of the power take-off and the rotational axis of the impeller are both substantially perpendicular to the longitudinal axis of the vehicle.

Preferably, the power take-off comprises a driving sprocket which drives a driven sprocket by means of a belt or chain. Alternatively, the power take-off may comprise a series of two or more gears.

Preferably, a decoupler is provided to selectively couple and decouple drive from the power take-off to the impeller of the marine propulsion means.

Preferably, the marine propulsion means is a centrifugal pump.

Advantageously, the prime mover and transmission are adapted to be mounted towards the rear of an amphibious vehicle so as to provide drive to a pair of rear wheels of the vehicle.

Preferably, the prime mover is an engine. Alternatively, the prime mover may be an electric motor which may be powered by a fuel cell.

In accordance with a second aspect of the invention, there is provided an amphibious vehicle comprising a power train in accordance with the first aspect of the invention.

BRIEF DESCRIPTION OF THE DRAWINGS

The invention will now be described, by way of example only, with reference to the accompanying drawings in which:

FIG. 3 shows a perspective view of a second embodiment of the invention including a transverse engine, transmission, differential, and a power take-off from the differential driving a centrifugal pump;

FIG. 4 shows a perspective view of a modification of the second embodiment, having an alternative form of power take off from the differential;

FIG. 5 shows a perspective view of a third embodiment of the invention including a transverse engine, transmission, differential, and a power take-off from the crankshaft of the engine driving a centrifugal pump;

FIG. 6 shows a perspective view of a fourth embodiment of the invention including a transverse engine and transmission, with a sandwich power take-off driving a centrifugal pump;

Detailed Description

Figure 1:
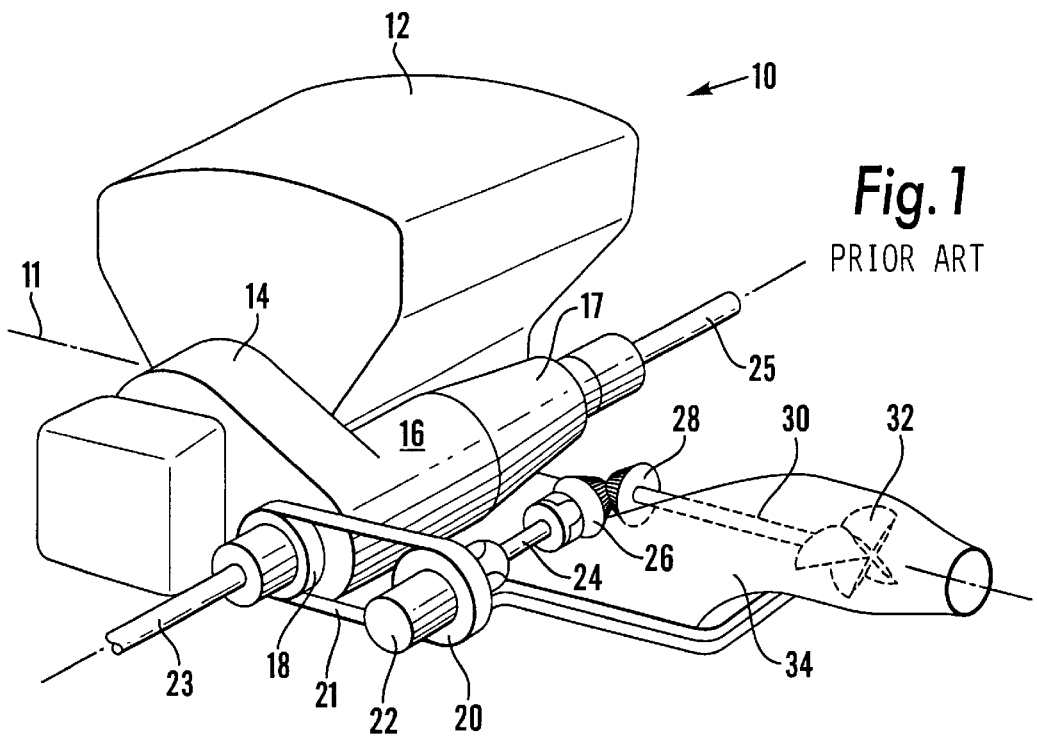
FIG. 1 shows a perspective view of a known arrangement of an engine and transmission in which a power take-off drives the drive shaft of a water jet unit through a pair of bevel gears.

Referring firstly to FIG. 1, a known power train arrangement as described in our copending European patent application No EP 1 174 300 is indicated generally at 10. An engine 12 is mounted transversely in a vehicle (not shown), that is with the axis of the crankshaft of the engine positioned perpendicular to the longitudinal axis of the vehicle, which is indicated in chain dotted line at 11. A transfer drive 14 transfers drive from the engine 12 to a transmission 16, positioned parallel with, and behind the engine 12. A differential 17 is driven from the right hand end (as viewed) of the transmission 16, and drives a pair of drive shafts 23,25. The drive shafts 23,25 provide drive to wheels (not shown) on either side of the vehicle. Decouplers may be fitted to one or both drive shafts 23, 25, as is known in the art, to disconnect drive to the road wheels when the vehicle is in marine mode.

A power take-off sprocket 18 extends from the left hand end (as viewed) of the transmission 16, which drives a driven sprocket 20 by means of a belt or chain 21. A decoupler 22 selectively couples and decouples drive from the driven sprocket 20 to a cardan shaft 24. A first bevel gear 26 is mounted at the end of the cardan shaft 24, which is in meshing engagement with a second bevel gear 28. The bevel gears 26, 28 transfer drive through 90 degrees to a drive shaft 30 of an impeller 32 of a waterjet unit 34. The drive shaft 30 is in axial alignment with the vehicle axis 11.

Figure 2:
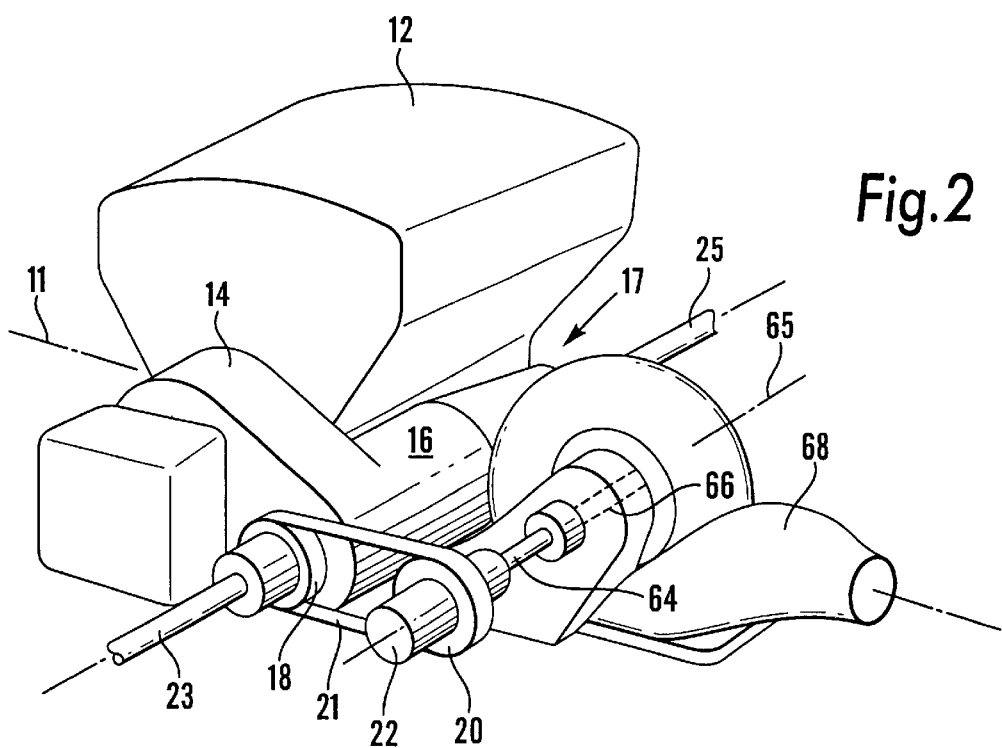
FIG. 2 shows a perspective view of a first embodiment of the invention including a transverse engine and transmission with a power take-off from the end of the transmission driving a centrifugal pump.

Referring to FIG. 2, a first embodiment of the invention will now be described. Common reference numerals will be used to designate parts in common with the parts in the known arrangement as shown in FIG. 1. A prime mover in the form of an engine 12 is arranged transversely to the longitudinal axis of the vehicle and drives a transmission 16, positioned parallel with, and behind the engine 12, by means of a transfer drive 14. A differential 17 is driven from the right hand end (as viewed) of the transmission 16, and drives a pair of drive shafts 23,25. The drive shafts 23,25 provide drive to wheels (not shown) on either side of the vehicle in known manner. In a particularly preferred arrangement, the shafts 23, 25 are arranged so as to provide drive to a pair of rear wheels of the vehicle.

A power take-off sprocket 18 extends from the left hand end (as viewed) of the transmission 16, which drives a driven sprocket 20 by means of a belt or chain 21. By the term "power take-off" is meant a means of enabling the engine power of the vehicle to be used to drive non-automotive apparatus, for example, a marine propulsion means. A decoupler 22 selectively couples and decouples drive between the drive sprocket 20 and a drive shaft 64, which is coupled directly to an impeller shaft 66 of a centrifugal pump 68. The axis of the drive shaft 64 and impeller shaft 66, indicated at 65, is perpendicular to the vehicle axis 11. The centrifugal pump 68 provides propulsion of the amphibious vehicle when the vehicle is in marine mode.

A second embodiment of the invention will now be described with reference to FIG. 3. Common reference numerals have been used to designate parts in common with the parts shown in FIGS. 1 and 2. As in the previous embodiment, a transverse engine 12 drives a transmission 16, positioned parallel with, and behind the engine 12, by means of a transfer drive 14. A differential 17 is driven from the right hand end (as viewed) of the transmission 16, and drives a pair of drive shafts 23,25. The drive shafts 23,25 provide drive to wheels (not shown) on either side of the vehicle in known manner.

A carrier drive 70 of the differential 17 drives a power take-off sprocket 72, which in turn drives a driven sprocket 74 through a belt or chain 76. A decoupler 78 selectively couples and decouples drive from the driven sprocket 74 to an impeller shaft 66 of a centrifugal pump 68. The axis of the impeller shaft 66, indicated at 65, is perpendicular to the vehicle axis 11. The centrifugal pump 68 provides propulsion of the amphibious vehicle when the vehicle is in marine mode.

FIG. 4 shows a modification to the second embodiment, in which the power take of from the differential is provided by means of a series of meshing gears 172–174 rather than by means of a drive belt or chain. In the arrangement shown, a first gear 172 mounted to a carrier drive of the differential engages with a second or idler gear 173 mounted to a counter shaft 175. The second gear in turn meshes with a third gear 174 which is connected to the impeller shaft 66 by a decoupler. The arrangement transmits drive from the differential to the impeller and by use of an idler gear it can be arranged that the impeller rotates in the same direction as the differential output. In practice the gears would be contained within a casing or cover, which is not shown for clarity, and the counter shaft 175 would be supported by the casing or cover.

A third embodiment of the invention will now be described with reference to FIG. 5, in which common reference numerals have been used to designate parts in common with the parts shown in FIG. 3. The third embodiment is similar to the second embodiment except that the drive for the marine propulsion means is taken from the timing end of the crankshaft of the engine rather than from the differential 17. To this end, a power take-off sprocket 72 is mounted for rotation with the timing end of the crankshaft (indicated generally at 80) and drives a driven sprocket 74 through a belt or chain 76. A decoupler 78 selectively couples and decouples drive from the driven sprocket 74 to an impeller shaft 66 of a centriftigal pump 68. The axis of the impeller shaft 66, indicated at 65, is perpendicular to the vehicle axis 11. The centrifugal pump 68 provides propulsion of the amphibious vehicle when the vehicle is in marine mode.

A fourth embodiment of the invention will now be described with reference to FIG. 6. A prime mover in the form of an engine 40 and an in-line transmission 42 are mounted transversely in a vehicle (not shown). The longitudinal axis of the vehicle is indicated by the chain dotted line 11. A transfer drive 44 from the drive output of the transmission 42 drives a differential 46 positioned with its centre line 47 offset to one side of, and parallel with the transmission 42. A drive shaft 48 is driven from one side of the differential 46, and a relay shaft 50, which is parallel with the crankshaft of the engine 40, is driven from the other side of the differential. The relay shaft 50 drives a further drive shaft 52. The drive shafts 48,52 drive wheels (not shown) on either side of the vehicle in known manner.

A power take-off sprocket (not shown), which is mounted at the end of the crankshaft of the engine 40, sandwiched between the engine and the transmission 42, drives a driven sprocket 54 by means of a belt or chain 56. The driven sprocket 54 drives a decoupler 58 which selectively couples and decouples drive to an impeller shaft 60 of a centrifugal pump 62. The axis of the impeller shaft 60, indicated at 63, is perpendicular to the vehicle axis 11. The centrifugal pump 62 provides propulsion of the amphibious vehicle when the vehicle is in marine mode.

Figure 7:
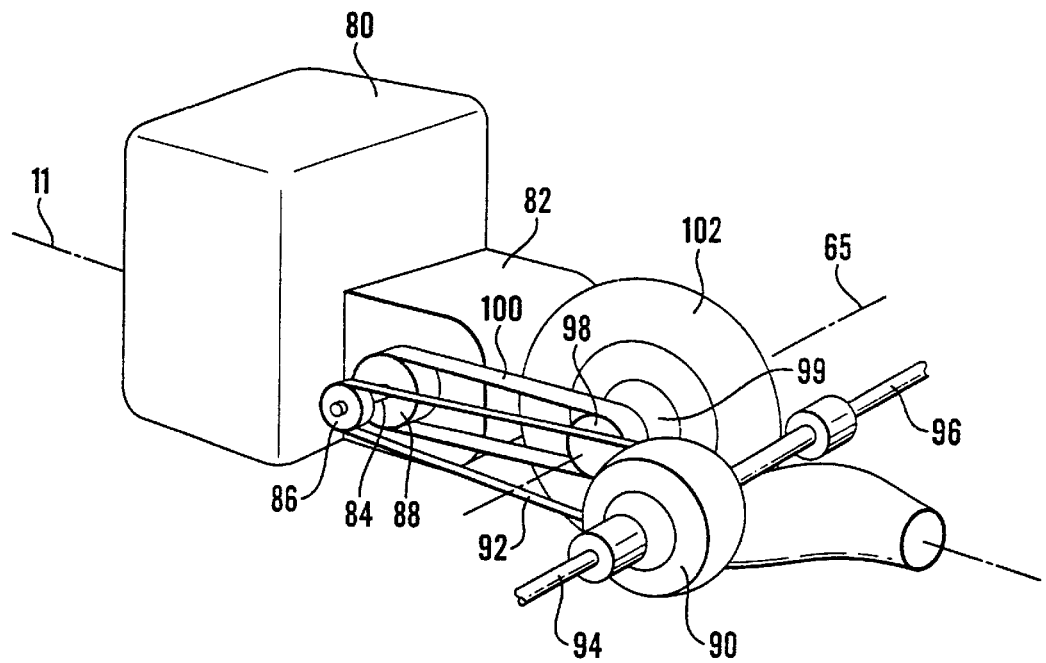
FIG. 7 shows a perspective view of a fifth embodiment of the invention including a conventional motor cycle power train adapted to drive a centrifugal pump and a differential.

Finally, a fifth embodiment of the invention will now be described with reference to FIG. 7. A conventional motorcycle engine 80 and parallel transmission 82 are mounted transverse to the vehicle axis 11, as in a motorcycle. An output shaft 84 of the transmission mounts a drive sprocket 86 and a power take-off sprocket 88. The drive sprocket 86 drives a driven sprocket (not shown) mounted on the carrier of a differential 90, by means of a belt or chain 92. Drive shafts 94, 96, on either side of the vehicle, are driven from the differential 90 and drive wheels (not shown) in known manner.

The power take-off sprocket 88 drives a driven sprocket 98 by means of a belt or chain 100. The driven sprocket 98 drives a decoupler 99 which selectively couples and decouples drive to an impeller shaft of a centrifugal pump 102. As in the previous embodiments, the axis of the impeller shaft, indicated at 65, is perpendicular to the vehicle axis 11, and the centrifugal pump 102 provides propulsion of the amphibious vehicle when the vehicle is in marine mode.

Figure 8:
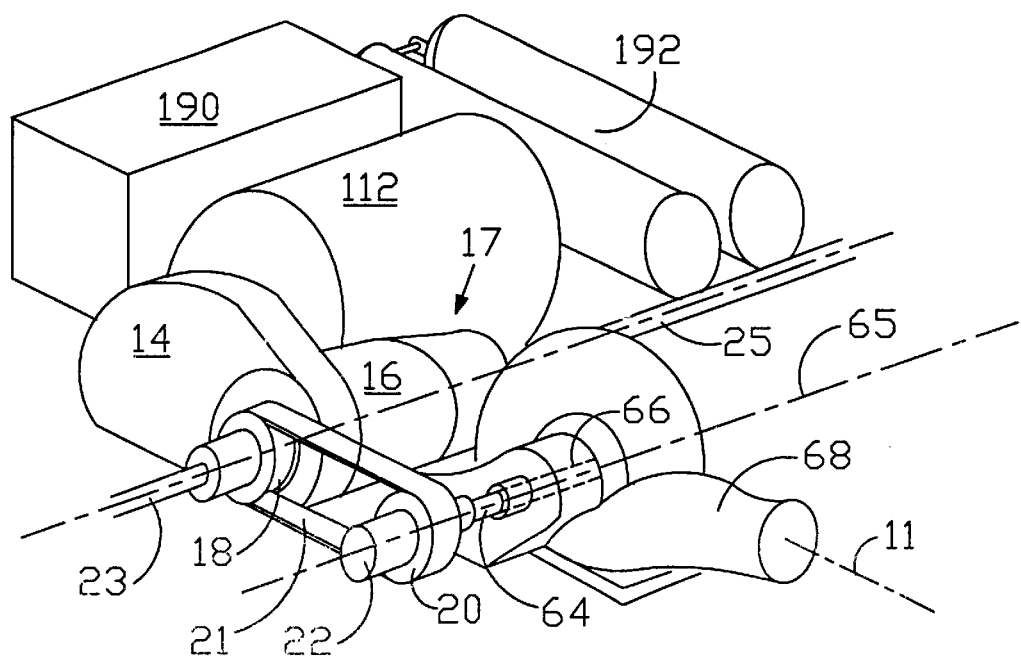
FIG. 8 shows a perspective view of a sixth embodiment of the invention, in which the prime mover is an electric motor powered by a fuel cell.

In all the embodiments of the invention described above, the prime mover is provided in the form of an engine. The engine can be of any suitable and type and may comprise a piston engine, a rotary engine or turbine and can be adapted to run on any suitable fuel such as petrol, diesel, gas, or liquid petroleum gas (LPG). However, it should be understood that the invention is not limited to power trains in which the prime mover is an engine but is intended to cover power trains having a prime mover of any suitable type. For example the prime mover could be an electric motor or it could be in the form of a hybrid combination of an engine with an electric motor. Where the prime mover comprises an electric motor, the electric motor could, for example, be powered by a fuel cell. This arrangement is illustrated in FIG. 8, in which a power train in accordance with the invention comprises a prime mover in the form of an electric motor 112 powered by means of a fuel cell stack 190 and fuel tanks 192, in a manner known in the art. The power train is otherwise substantially as described above with reference to FIG. 2.

A power train in accordance with the invention provides a compact and efficient means of driving both the road wheels and a marine propulsion unit of an amphibious vehicle. The arrangement is particularly suited for mounting towards the rear of an amphibious vehicle so as to drive the rear wheels of the vehicle.

Whereas the invention has been described in relation to what is presently considered to be the most practical and preferred embodiments, it is to be understood that the invention is not limited to the disclosed arrangements but rather is intended to cover various modifications and equivalent constructions included within the spirit and scope of the invention. For example, the decoupler on the power take-off to the marine drive is not essential to the concept of the invention, and may therefore be omitted. Decouplers may also be fitted to one or both wheel drive shafts 23, 25, to disconnect drive to the road wheels when the vehicle is in marine mode. Furthermore, whilst the preferred form of power take-off comprises a driving sprocket and a driven sprocket interconnected by means of a belt or chain, this need not be the case and any suitable form of power take-off can be used. For example, the power take-off could comprise driving and driven pulleys interconnected by means of a belt or the power take-off may be in the form of a series of two or more meshing gears as described with reference to FIG. 4.

What is claimed is:

1. An amphibious vehicle having a power train, the power train comprising a prime mover, a transmission and a marine propulsion means, the transmission having a power take-off arranged to drive said marine propulsion means only, in which the marine propulsion means has an impeller wherein a rotational axis of power take-off and a rotational axis of the impeller are both substantially perpendicular to the longitudinal axis of the vehicle and extend generally in a lateral direction of the vehicle.

2. The amphibious vehicle as claimed in claim 1, wherein the power take-off comprises a driving sprocket which drives a driven sprocket by means of a belt or chain.

3. The amphibious vehicle as claimed in claim 1, wherein the power take-off comprises a series of two or more gears.

4. The amphibious vehicle as claimed in claim 1, wherein a decoupler is provided to selectively couple and decouple drive from the power take-off to the impeller of the marine propulsion means.

5. The amphibious vehicle as claimed in claim 1, wherein the marine propulsion means is a centrifugal pump.

6. The amphibious vehicle as claimed in claim 1, wherein the prime mover and transmission are mounted towards the rear of the amphibious vehicle so as to provide drive to a pair of rear wheels of the vehicle.

7. The amphibious vehicle as claimed in claim 1, wherein the prime mover is an engine.

8. The amphibious vehicle as claimed in claim 1, wherein the prime mover is an electric motor.

9. The amphibious vehicle as claimed in claim 8, wherein the electric motor is powered at least partly by means of a fuel cell.

10. A power train for an amphibious vehicle having a drive line to road wheels, the power train comprising: a prime mover, a transmission, a marine propulsion means having an impeller shaft, and a power take-off for driving the impeller shaft, wherein a rotational axis of the power take-off and a rotational axis of the impeller shaft are both substantially perpendicular to the longitudinal axis of the vehicle and extend in a lateral direction of the vehicle, and wherein the impeller shaft is separate to, and spaced from, the drive line to the road wheels.

11. The power train of claim 10, wherein the power take-off includes a driving sprocket which drives a driven sprocket by means of a belt or chain.

12. The power train of claim 10, wherein the power take-off includes a series of two or more gears.

13. The power train of claim 10, further comprising a decoupler to selectively couple and decouple drive from the power take-off to the impeller shaft.

14. The power train of claim 10, wherein the marine propulsion means is a centrifugal pump.

15. The power train of claim 10, wherein the prime mover and transmission are adapted to be mounted towards the rear of the amphibious vehicle to provide drive to the rear wheels.

16. The power train of claim 10, wherein the prime mover is an engine.

17. The power train of claim 10, wherein the prime mover is an electric motor.

18. The power train of claim 10, wherein the electric motor is powered at least partly by means of a fuel cell.

19. An amphibious vehicle comprising a power train in accordance with claim 10.

* * * * *